United States Patent
Liu et al.

(10) Patent No.: US 8,810,069 B2
(45) Date of Patent: Aug. 19, 2014

(54) SYSTEM AND METHOD FOR MAXIMIZING POWER OUTPUT OF PHOTOVOLTAIC STRINGS

(75) Inventors: Yu Liu, Milwaukee, WI (US); George W. Oughton, Raleigh, NC (US); Christopher Scott Thompson, Kingston, RI (US)

(73) Assignee: Eaton Corporation, Cleveland, OH (US)

( * ) Notice: Subject to any disclaimer, the term of this patent is extended or adjusted under 35 U.S.C. 154(b) by 552 days.

(21) Appl. No.: 13/238,103

(22) Filed: Sep. 21, 2011

(65) Prior Publication Data
US 2013/0069438 A1    Mar. 21, 2013

(51) Int. Cl.
*H02J 1/00*    (2006.01)

(52) U.S. Cl.
USPC .......................................................... 307/82

(58) Field of Classification Search
USPC .......................................................... 307/82
See application file for complete search history.

(56) References Cited

U.S. PATENT DOCUMENTS

| 2008/0122449 A1 | 5/2008 | Besser et al. |
| 2008/0150366 A1 | 6/2008 | Adest et al. |
| 2009/0150005 A1 | 6/2009 | Hadar et al. |
| 2009/0248232 A1 | 10/2009 | Sennett et al. |
| 2009/0284998 A1 | 11/2009 | Zhang et al. |
| 2010/0001587 A1 | 1/2010 | Casey et al. |
| 2010/0142227 A1 | 6/2010 | Min et al. |
| 2010/0229915 A1 | 9/2010 | Ledenev et al. |
| 2011/0031816 A1 | 2/2011 | Buthker et al. |
| 2011/0062784 A1 | 3/2011 | Wolfs |

FOREIGN PATENT DOCUMENTS

GB    2476508 A    6/2011

OTHER PUBLICATIONS

PCT International Search Report and Written Opinion from corresponding PCT/US2012/055854, Jul. 9, 2013.
Bo et al., "A New Architecture for High Efficiency Maximum Power Point Tracking in Grid-Connected Photovoltaic System," IEEE, 2009, pp. 2117-2121.

*Primary Examiner* — Robert L. Deberadinis
(74) *Attorney, Agent, or Firm* — Ziolkowski Patent Solutions Group, SC

(57) ABSTRACT

A PV system includes a plurality of PV strings each having an optimal string voltage at which a string output power is maximized. The PV strings are connected to a DC link in a parallel arrangement such that each PV strings operates at a variable DC link voltage. A PV inverter is connected to the DC link to receive a DC output, with the PV inverter controlling the DC link voltage. Delta DC/DC converters are connected to the PV strings, with each DC/DC converter receiving the DC link voltage from the DC link and providing a tuning voltage to the DC link voltage at which its respective PV string operates in order to bring the string voltage for that PV string to its optimal string voltage. The tuning voltage of each delta DC/DC converter is the difference between the DC link voltage and a respective optimal string voltage.

23 Claims, 6 Drawing Sheets

SYSTEM AND METHOD FOR MAXIMIZING POWER OUTPUT OF PHOTOVOLTAIC STRINGS

BACKGROUND OF THE INVENTION

Embodiments of the present invention relate generally to electronic power conversion and, more particularly, to power regulation of photovoltaic (PV) arrays that provides for increased power output for such PV arrays.

Photovoltaic (PV) cells generate direct current (DC) power, with the level of DC current being dependent on solar irradiation and the level of DC voltage dependent on temperature. When alternating current (AC) power is desired, an inverter is used to convert the DC energy into AC energy, such as AC energy suitable for transfer to a power grid. Typical PV inverters employ two stages for power processing. The first stage of the PV inverter is configured to regulate a widely varying DC voltage from an array of PV cells, so as to provide a constant DC voltage output. The second stage of the PV inverter is configured to convert the constant DC voltage to AC voltage. Often, the first stage includes a boost converter, and the second stage includes a single-phase or three-phase inverter system.

One common arrangement in PV systems is for several PV modules to be connected in series to form a PV string, with multiple PV strings in a PV system then being connected in parallel to supply more current. In PV systems where a great number of PV strings are connected in parallel, it is required that all string voltages be identical based on their parallel connection. However, the optimal operation voltage of each PV string might not be the same in terms of maximum power extraction. That is, due to shading issues, uneven temperature distribution, and/or other specific characteristics of individual PV strings, the optimal voltages for each PV string may vary. While the differences in the optimal operation voltages for each PV string are typically small (i.e., less than 20V), the parallel connection of PV strings can still lower the efficiency and production of the PV system up to about 15%.

It would therefore be desirable to provide a PV system that functions to operate each PV string at its optimal voltage so as to achieve maximum power extraction. It would also be desirable to provide a PV system that is able to track voltage and power outputs for each PV string and implement a technique for dynamically controlling each PV string.

BRIEF DESCRIPTION OF THE INVENTION

Embodiments of the present invention provide a system and method for power regulation of photovoltaic (PV) arrays that provides for increased power output for such PV arrays.

In accordance with one aspect of the invention, a photovoltaic (PV) system includes a plurality of PV strings configured to generate a string output power responsive to received solar irradiation, with each of the plurality of PV strings having an optimal string voltage at which a string output power is maximized. The plurality of PV strings is connected to a DC link in a parallel arrangement such that each of the plurality of PV strings operates at a variable DC link voltage. The PV system also includes a PV inverter electrically connected to the DC link to receive a DC output therefrom, the PV inverter configured to control the DC link voltage and a delta DC/DC converter electrically connected to at least one of the plurality of PV strings. Each DC/DC converter receives the DC link voltage from the DC link and is configured to provide a tuning voltage to the DC link voltage at which its respective PV string operates in order to bring the string voltage for that PV string to its optimal string voltage, with the tuning voltage of each delta DC/DC converter being a difference between the DC link voltage and a respective optimal string voltage.

In accordance with another aspect of the invention, a method for maximizing power output of a photovoltaic (PV) system including a plurality of PV strings in a parallel arrangement is provided. The method includes the step of operating each of the plurality of PV strings at a DC bus voltage, with the DC bus voltage being determined by a PV inverter that is coupled to the plurality of PV strings by way of a DC bus. The method also includes the steps of providing the DC bus voltage to a delta DC/DC converter electrically connected to each PV string and determining an optimal string voltage for each PV string at which a string output power is maximized, with the optimal string voltage for each PV string being determined from a respective string current and string voltage. The method further includes the steps of comparing, for each PV string, the DC bus voltage to the optimal string voltage of each respective PV string, selectively controlling each delta DC/DC converter based on the comparison of the DC bus voltage and the optimal string voltage of its respective PV string, and operating each PV string at its respective optimal string voltage based on the selective controlling of each DC/DC converter.

In accordance with yet another aspect of the invention, a photovoltaic (PV) system includes a PV inverter and a DC link electrically coupled to the PV inverter and operating at a DC link voltage, wherein the DC link voltage is a variable voltage that is determined by the PV inverter according to a global maximum power point tracking (MPPT) algorithm. The PV system also includes a plurality of PV strings connected to the DC link in a parallel arrangement and being configured to generate a string output power responsive to received solar irradiation, wherein each of the plurality of PV strings has an optimal string voltage at which the string output power is maximized. The PV system further includes a plurality of delta DC/DC converters connected to the plurality of PV strings, with each delta DC/DC converter being connected at least one PV string and to the DC link to receive the DC link voltage therefrom. Each delta DC/DC converter includes a controller programmed to determine the optimal string voltage for its respective PV string at which the string output power is maximized based on a string current and string voltage of its respective PV string compare the DC link voltage to the optimal string voltage of its respective PV string, determine an output voltage needed to bring the string voltage for its respective PV string to its optimal string voltage, and cause the delta DC/DC converter to generate the output voltage, with the output voltage being applied to the respective PV string to generate a string voltage equal to the optimal string voltage. The output voltage is a difference between the DC link voltage and the respective optimal string voltage.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

Embodiments of the invention set forth herein relate to a system and method for power regulation of photovoltaic (PV) arrays or strings that provides for increased power output for such PV strings. A PV system is provided that includes a plurality of PV strings connected in parallel, with each PV string including a plurality of PV modules connected in series. A delta DC/DC power converter is connected to each PV string that is configured to modify the working voltage of its respective PV string to a determined optimal voltage for that PV string. The optimal voltage for each PV string causes that PV string to output a maximum power, with the maximum power output from each PV string being combined to generate a maximized PV system power.

Figure 1:
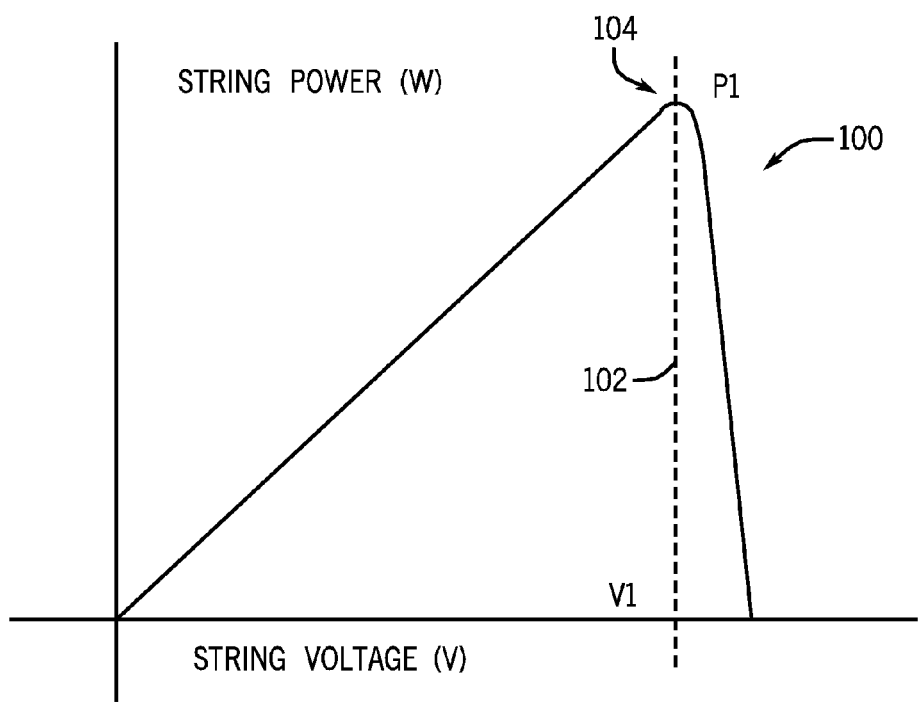
FIG. 1 is a graph illustrating a power versus voltage curve of a photovoltaic (PV) string.

Referring to FIG. 1, a graph illustrating the operating characteristics of a photovoltaic (PV) array or string, as described by a power v. voltage curve 100, is provided. The PV string operates to output a string power (W), indicated along the y-axis, as a function of its string voltage (V), indicated along the x-axis. At a certain optimal operation voltage, V1, indicated by dashed line 102, the PV string outputs a maximum string power, P1, indicated at 104. Thus, in order to maximize production/output of the PV string, it is desirable to operate the PV string at its optimal operation voltage 102 so as to achieve maximum power extraction 104.

Figure 2:
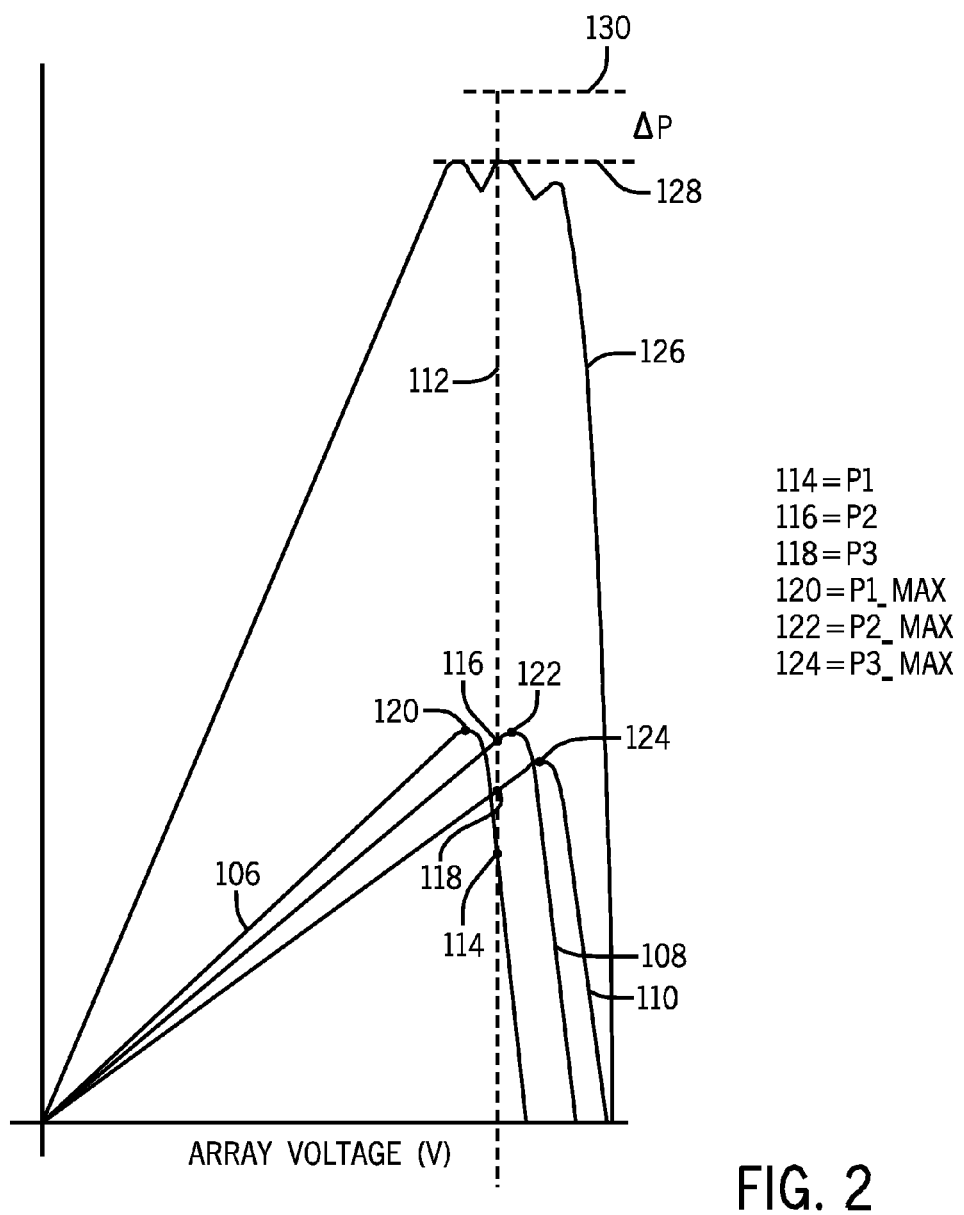
FIG. 2 is a graph illustrating power versus voltage curves of an array of PV strings and of power extraction from the array of PV strings at a common operating voltage for all PV strings and at an optimal operating voltage each PV string.

As is known, the shape of the power vs. voltage curve is dependent on characteristics of a particular PV string, such as shading issues, uneven temperature distribution, and/or other specific characteristics of individual PV strings, and thus can vary between PV strings (and between modules on each string). Accordingly, the optimal operation voltage of a first PV string that causes a corresponding maximum string power to be generated by the PV string might not be the same for other PV strings. Such a variation in optimal operation voltages for a plurality of PV strings is shown in FIG. 2, where a graph illustrating power vs. voltage curves for an arrangement of three PV strings is provided. First, second, and third power vs. voltage curves 106, 108, 110 are shown corresponding to three separate PV strings, with the shape of each power vs. voltage curve varying from the others based on the factors set forth above.

In a PV system where three PV strings are connected in parallel, it is recognized that the PV strings must be all operated at a common string voltage, indicated by dashed line 112. The string power for each PV string is based on that common string voltage, with the string power, P1, P2, P3, for each PV string at the common string voltage being indicated at 114, 116, 118, respectively. As can be seen in FIG. 2, however, the string powers P1, P2, and P3 are not necessarily the maximum string power, P1_max, P2_max, and P3_max, that could be achievable for each PV string, indicated at 120, 122, 124, respectively. That is, if the string voltage for a particular PV string is not the same as the optimal operation voltage for that PV string, then the string power output for that PV string would not reach the maximum string power.

As shown in FIG. 2, a power vs. voltage curve for the array of three PV strings (i.e., the "PV system) 126 is determined, with the PV array voltage being equal to the sum of the individual PV string voltages. When each PV string is operated at the common string voltage, indicated at dashed line 112, the array power for the array of three PV strings is determined according to:

$$P_{array\_common} = P_1 + P_2 + P_3 \quad [\text{Eqn. 1}].$$

The maximum array power, $P_{array\_common}$, achievable for the array of three PV strings when each PV string is operated at the common string voltage is illustrated by dashed line 128, and is termed here as a "state-of-the-art maximum power." However, this state-of-the-art maximum power could be exceeded if each of the three PV strings were allowed to work/operate individually at its own optimal voltage. In such a mode of operation, the maximum array power achievable for the array of three PV strings would then be determined according to:

$$P_{array\_optimal} = P_{1\_max} + P_{2\_max} + P_{3\_max} \quad [\text{Eqn. 2}].$$

A maximum array power, $P_{array\_optimal}$, achievable for the array of three PV strings when each PV string is operated at its own optimal voltage is illustrated by dashed line 130. Thus, as illustrated, the maximum array power can be increased by an amount ΔP over the state-of-the-art maximum power by operating each PV string at its own optimal voltage rather than at a common string voltage.

Figure 3:
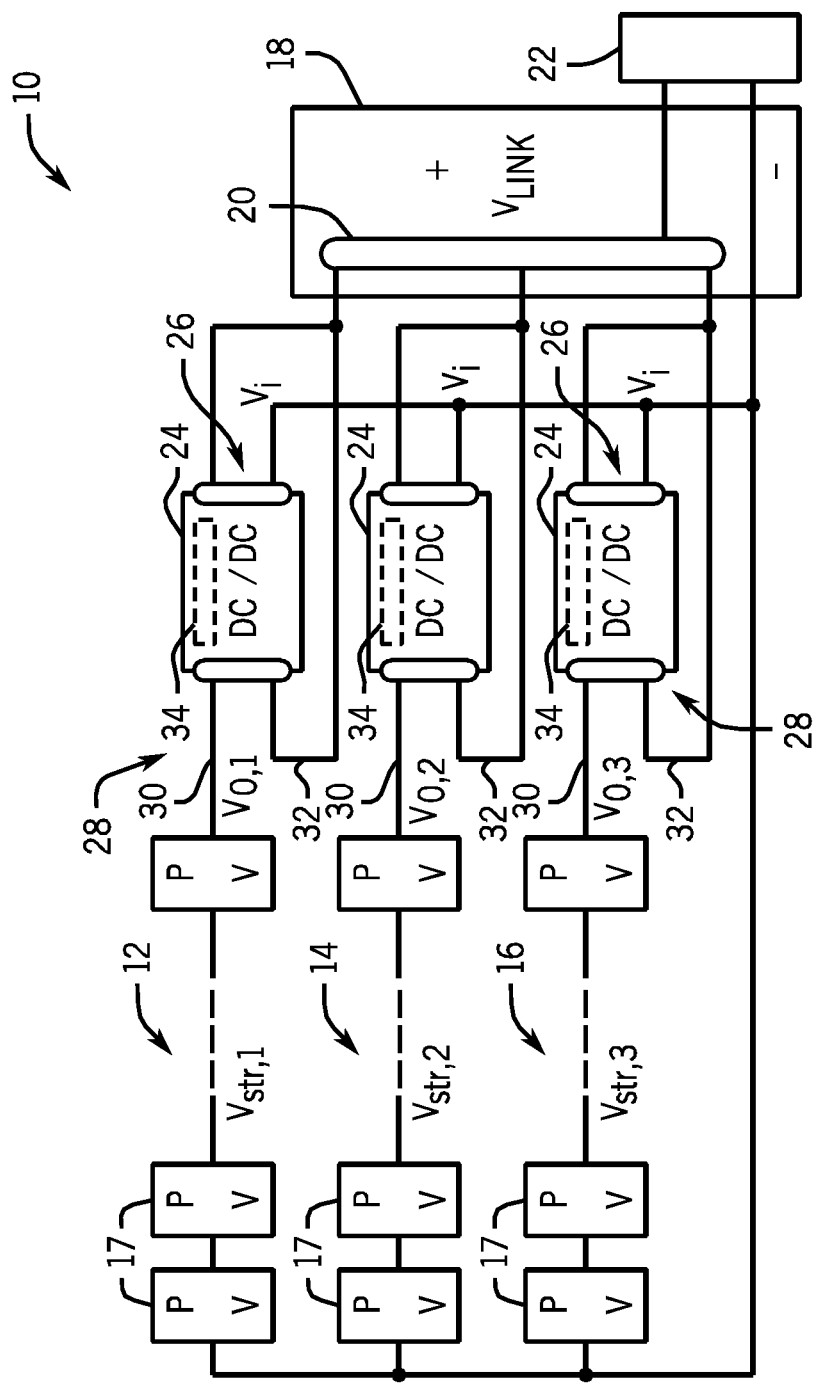
FIG. 3 is a schematic diagram of a PV system according to an embodiment of the invention.

Referring now to FIG. 3, a PV system 10 is illustrated according to an embodiment of the invention, in which the potential power gain ΔP illustrated in FIG. 2 can be captured or harvested. The PV system 10 includes a plurality of PV strings 12, 14, 16, with each PV string being comprised of a plurality of PV modules 17 that are connected in series. The PV strings 12, 14, 16 are electrically connected in parallel to a combiner box 18 that houses a DC link or bus 20 therein. According to one embodiment, the DC link is in the form of a DC link circuit that includes a DC capacitor.

Also included in PV system 10 is a PV inverter 22 that is electrically connected to the combiner box 18 and the DC link 20. The PV inverter 22 operates to perform the conversion of the variable DC output of the PV modules 17 of PV strings 12, 14, 16 into a utility frequency AC current that can be fed into the commercial electrical system or used by a local electrical network, for example. According to embodiments of the invention, PV inverter 22 may have a single-stage design that provides only a DC/AC inversion or a two-stage design that provides a DC/DC conversion and a DC/AC inversion. According to embodiments of the invention, PV inverter 22 is further configured to perform a system level (or "global") maximum power point tracking (MPPT) in PV system 10 according to an array power algorithm implemented thereby. In performing such a global MPPT, PV inverter 22 functions to get the maximum possible power from the PV system 10 by applying a resistance (load) to obtain maximum power for any given environmental conditions. The PV inverter 22 functions to control the DC link/bus voltage, $V_{link}$ (or $V_{bus}$), according to the MPPT instituted by the array power algorithm based on the desired or maximum power to be output from the PV system 10, and essentially defines the current that the inverter 22 should draw from the PV strings 12, 14, 16 in order to get the maximum possible power (since power equals voltage times current) for the PV system 10.

As shown in FIG. 3, PV system 10 also includes a plurality of delta DC/DC converters 24, with a separate delta DC/DC converter 24 being electrically connected or coupled to each PV string 12, 14, 16 in the PV system 10. According to embodiments of the invention, the plurality of DC/DC converters 24 may be in the form of galvanic isolated DC/DC converters or galvanic non-isolated DC/DC converters. Each DC/DC converter 24 includes an input 26 electrically coupled to DC link 20 in combiner box 18 and an output 28 electrically coupled to its respective PV string 12, 14, 16. The output 28 includes two output terminals 30, 32 that are connected with a respective PV string 12, 14, 16 in series. While the DC/DC converters 24 are shown in FIG. 3 as being positioned at the positive terminal of the PV strings 12, 14, 16, it is recognized that, according to another embodiment of the invention, the DC/DC converters 24 could instead be positioned at the negative terminal of the PV strings 12, 14, 16. Thus, both topologies are envisioned to fall within the scope of the invention.

Each delta DC/DC converter 24 also includes a controller 34 operationally connected thereto to control functioning of the DC/DC converter 24, so as to selectively vary a voltage output, $V_o$, of the DC/DC converter 24 that provides "tuning" of respective PV string voltages. That is, as set forth above, in a PV system 10 where PV strings 12, 14, 16 are connected in parallel, it is recognized that the PV strings must be all operated at a common string voltage. However, this common string voltage may not be the optimal operating/working voltage at which a particular PV string could operate to generate a maximum string power. Accordingly, each delta DC/DC converter 24 is configured to determine and provide an appropriate "tuning voltage" for its respective PV string 12, 14, 16 that brings the common string voltage to an optimal voltage for that string. It is recognized that the tuning voltage generated by each DC/DC converter 24 will vary in magnitude, and may be in the form of a voltage having a positive value, a negative value, or a zero value, depending on the voltage needed (if any) to bring the common string voltage to an optimal voltage for that string. The output voltage should be regulated in the range from 0V to a certain positive or negative value. For example, for a PV string voltage is from 300V to 600V, the output voltage of the DC/DC converter 24 can be regulated from 0V to 40V. It is recognized that this voltage range/value is merely exemplary, and that the voltage range/value can be a much larger or smaller number.

The controller 34 of each delta DC/DC converter 24 includes a "localized" power maximizing algorithm programmed thereon to iteratively adjust and control generation of an output or tuning voltage, $V_o$, from its respective DC/DC converter 24. Controller 34 is thus programmed to track a reference of the output voltage, $V_{o,ref}$ of the DC/DC converter 24 over a plurality of iterations, so as to dynamically update the output/tuning voltage generated by DC/DC converter 24. According to an exemplary embodiment, the localized power maximizing algorithm is executed at a first frequency, $f_{local}$, so as to update the output/tuning voltage generated by DC/DC converter 24. The frequency, $f_{local}$, may be 1,000 Hz, for example. According to embodiments of the invention, the frequency, $f_{local}$, at which the power maximizing algorithm of controller 34 is executed, for control of DC/DC converters 24, is greater than the frequency at which the global maximum power tracking for the for the entire PV system 10 is performed. That is, the DC link voltage, $V_{link}$, is controlled by the PV inverter 22 according to the global MPPT, and a reference of the DC link voltage, $V_{link,ref}$ is tracked over a plurality of iterations, with the tracking being accomplished by way of the global array power algorithm that is executed at a second frequency, $f_{global}$, that is less than the first frequency, $f_{local}$, at which the local power maximizing algorithm for controlling the tuning voltage is executed by controller 34. The second frequency, $f_{global}$, may be 10 Hz, for example.

In operation, the controller 34 of each delta DC/DC converter 24 functions to determine a level of output voltage needed to be generated by DC/DC converter 24 to bring the DC link voltage, $V_{link}$, (i.e., common string voltage) to an optimal voltage for its respective PV string 12, 14, 16. In doing so, the controller 34 first identifies a value of the string power for its respective PV string, i.e., the string voltage and the string current. As set forth above, the string voltage for each PV string is a common string voltage based on the parallel arrangement of the PV strings. The controller 34 then determines the optimal string voltage for the respective PV string 12, 14, 16 at which the string output power is maximized based on the string power. The controller 34 then compares the DC link voltage to the determined optimal string voltage to determine a value of the tuning voltage, $V_o$, to apply to the respective PV string 12, 14, 16, with the tuning voltage being the difference between the DC link voltage and the optimal string voltage. The controller 34 then causes DC/DC converter 24 to generate and apply a tuning voltage having the determined value to the respective PV string 12, 14, 16, such that the working voltage at which the PV string operates is its optimal string voltage. It is recognized that the tuning voltage generated by each DC/DC converter 24 will vary in magnitude, and may be in the form of a voltage having a positive value, a negative value, or a zero value. That is, the controller 34 checks if string power increases or decreases based on the applied tuning voltage. If the power increases, then the controller 34 adds one more change on the output voltage of delta DC/DC converter 24 with the same direction. If power decreases, then the controller 34 adds one more change on output voltage of delta DC/DC converter 24 with the opposite direction.

In practice, the level of output/tuning voltage, $V_o$, generated by each DC/DC converter 24 is quite small as compared to the overall PV system 10 voltages. That is, the differences between the optimal operation voltages of the PV strings 12, 14, 16 are typically small, such as less than 40V. Thus, the output voltage of the DC/DC converters 24 is also typically 40V or less, such that the total power rating of the DC/DC converters 24 is only about 5% of the whole PV system 10 power rating. Thus, according to one embodiment, small delta DC/DC converters 24 can be included in PV system 10 for connection to each PV string 12, 14, 16 in series.

In operation of PV system 10, and as shown in FIG. 3, an input voltage, $V_i$, is provided to each delta DC/DC converter 24 from the DC link 20. This input voltage $V_i$ is the DC link voltage, $V_{link}$. Upon start-up of the PV system 10 (i.e., upon an initial iteration of the PV system 10 operation), the DC/DC converters 24 do not generate any output voltage/tuning voltage, and thus the initial working voltage of each PV string 12, 14, 16 is the DC link voltage, $V_{link}$, based on the parallel connection of the PV strings 12, 14, 16 to DC link 20 of combiner box 18. A string voltage, $V_{str}$, is output from each PV string 12, 14, 16, with an overall array or system voltage/power being routed to PV inverter 22 for inversion to an appropriate AC current for transmission to the power grid, for example.

After an initial iteration (or handful of iterations), the delta DC/DC converters 24 are engaged so as to enable generation of an output voltage/tuning voltage if required. The controller 34 associated with each DC/DC converter 24 determines an optimal string voltage for its respective PV string 12, 14, 16 at which the string output power is maximized based on the string power of that PV string and subsequently determines a value of the tuning voltage, $V_o$, to apply to its respective PV string based on a comparison of the DC link voltage and the optimal string voltage for its respective PV string. The controllers 34 then cause their associated DC/DC converter 24 to generate and apply a tuning voltage having the determined value to the respective PV string 12, 14, 16, such that the working voltage at which that PV string operates is its optimal string voltage.

The voltage of each PV string is thus described by:

$$V_{str\_n} = V_{link} - V_{o\_n} \qquad \text{[Eqn. 3]},$$

where n refers to the string number of a particular PV string (i.e., first PV string 12, second PV string 14, third PV string 16). Thus, $V_{o\_n}$ will or may vary for each PV string 12, 14, 16 based on the determined optimal string voltage for that string, as determined by the controller 34 for that string.

Figure 4:
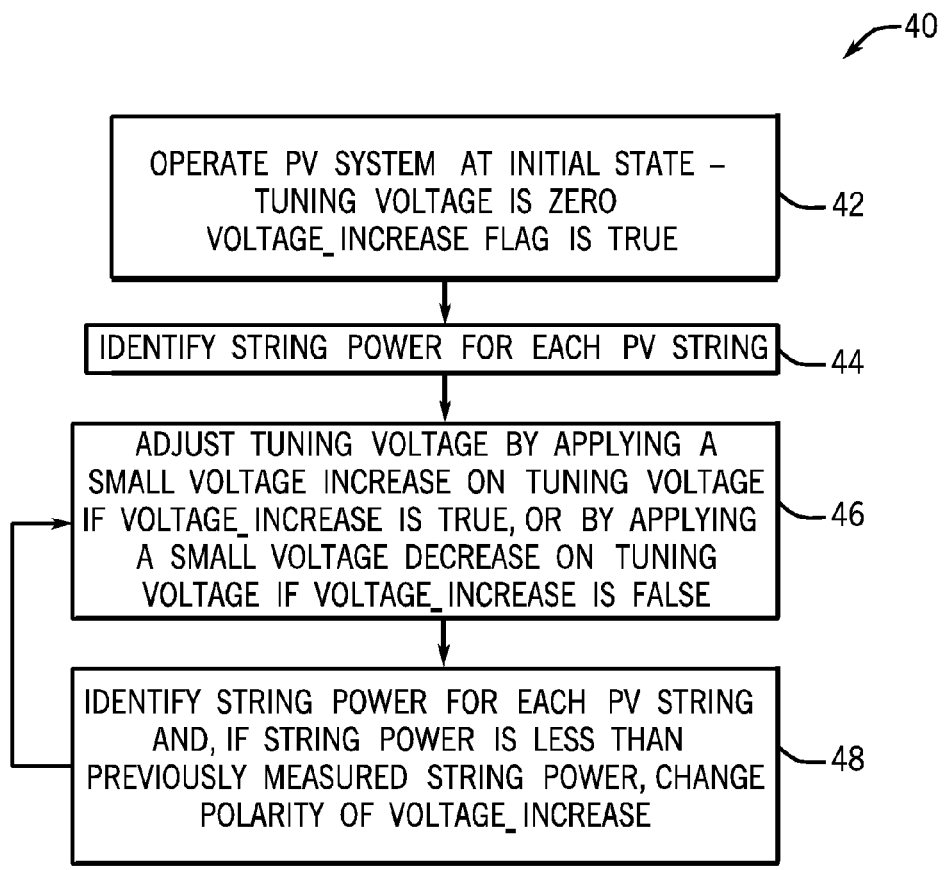
FIG. 4 is a technique for controlling the operation of the PV system of FIG. 3 according to an embodiment of the invention.

Referring now to FIG. 4, and with continued reference to FIG. 3, a flowchart illustrating a technique 40 for controlling the operation of PV system 10 is provided. As set forth above, controllers 34 control operation of delta DC/DC converters 24 by execution of a localized power maximizing algorithm to determine tuning voltages that should be output by each DC/DC converter 24 to bring each respective PV string 12, 14, 16 to its optimal string voltage, so as to maximize power output therefrom.

Technique 40 begins at STEP 42, where the PV system 10 is in/at an "initial state" with the tuning voltage being output by DC/DC converters 24 being at zero. Accordingly, each of the plurality of PV strings 12, 14, 16 is operated at a common/identical working voltage equal to a DC link voltage. The DC link voltage $V_{link}$ is determined by PV inverter 22 of PV system 10 and is controlled and varied thereby as determined according to the "global" maximum power point tracking (MPPT) performed by the inverter 22. That is, the DC link voltage $V_{link}$ is a voltage that is variably controlled by PV inverter 22 based on the MPPT performed thereby according to the array power algorithm, with the DC link voltage being set so as to obtain maximum power from PV strings 12, 14, 16 for given environmental conditions.

The DC link voltage determined by PV inverter 22 is provided to the DC/DC converters 24, with the controllers 34 each implementing a "localized" power maximizing algorithm to iteratively adjust and control generation of an output or tuning voltage, $V_o$, from each respective delta DC/DC converter 24 that brings the working voltage for that respective string up to its optimal voltage. At STEP 44, the controller 34 associated with each delta DC/DC converter 24 identifies a value of the string power for its respective PV string, i.e., identifies the string voltage and the string current, with it being recognized that initially the working string voltage for each PV string will be a common string voltage based on the parallel arrangement of the PV strings.

At STEP 46, the tuning voltage generated by each DC/DC converter 24 is adjusted from its initial zero value to a positive or negative value based on the identified string power of its respective PV string. In modifying the tuning voltage, the controller 34 of each DC/DC converter 24 determines the optimal string voltage for its respective PV string at which its string output power is maximized, with the optimal string voltage for each PV string being determined from the identified string power for that respective string. Each controller 34 compares the DC link voltage to the optimal string voltage for its respective PV string 12, 14, 16 and, based on this comparison, then determines whether to increase or decrease the value of the tuning voltage, $V_o$. According to one embodiment of the invention, a Voltage_Increase flag is implemented to determine whether the tuning voltage value is to be increased or decreased. If the Voltage_Increase flag is set to "True," then technique 40 determines that a small voltage increase is to be applied to the tuning voltage to adjust the value thereof in a positive direction. Conversely, if the Voltage_Increase flag is set to "False," then technique 40 determines that a small voltage decrease is to be applied to the tuning voltage to adjust the value thereof in a negative direction. Each controller 34 then causes the delta DC/DC converter 24 to generate and apply a positive or negative tuning voltage to its respective PV string 12, 14, 16 based on the above determinations.

As shown in FIG. 4, technique 40 continues with the controller 34 again identifying the string power and performing a check/determination at STEP 48 for each PV string to determine if the string power has increased or decreased based on the applied tuning voltage. If the string power of a respective PV string increases, then the controller 34 for that string adds one more change on the output voltage of delta DC/DC converter 24 with the same direction (i.e., applies a voltage increase to the tuning voltage). If the string power of a respective PV string decreases, then the controller 34 for that string adds one more change on output voltage of delta DC/DC converter 24 with the opposite direction (i.e., applies a voltage decrease to the tuning voltage). Technique 40 then loops back to STEP 46 for further adjustment of the tuning voltage applied to each PV string, such that the tuning voltages are iteratively adjusted in small increments/amounts till each PV string reaches its optimal string voltage.

An example of the implementation of technique 40 is provided herebelow for a PV system with three PV strings in a parallel arrangement and a delta DC-DC converter corresponding to each string, such as the PV system 10 illustrated in FIG. 3. The three PV strings 12, 14, 16 have different characteristics for the relationship between power and voltage, with the difference between optimal voltages for the first and second strings being 40V and the difference between optimal voltages for the first and third strings being −35V. The frequency at which the maximum power tracking for the for the entire PV array is performed, $f_{global}$, is 10 Hz, and the frequency at which the power maximizing algorithm is executed by controllers 34 for controlling DC/DC converters 24, $f_{local}$, is 1,000 Hz.

Figure 5:
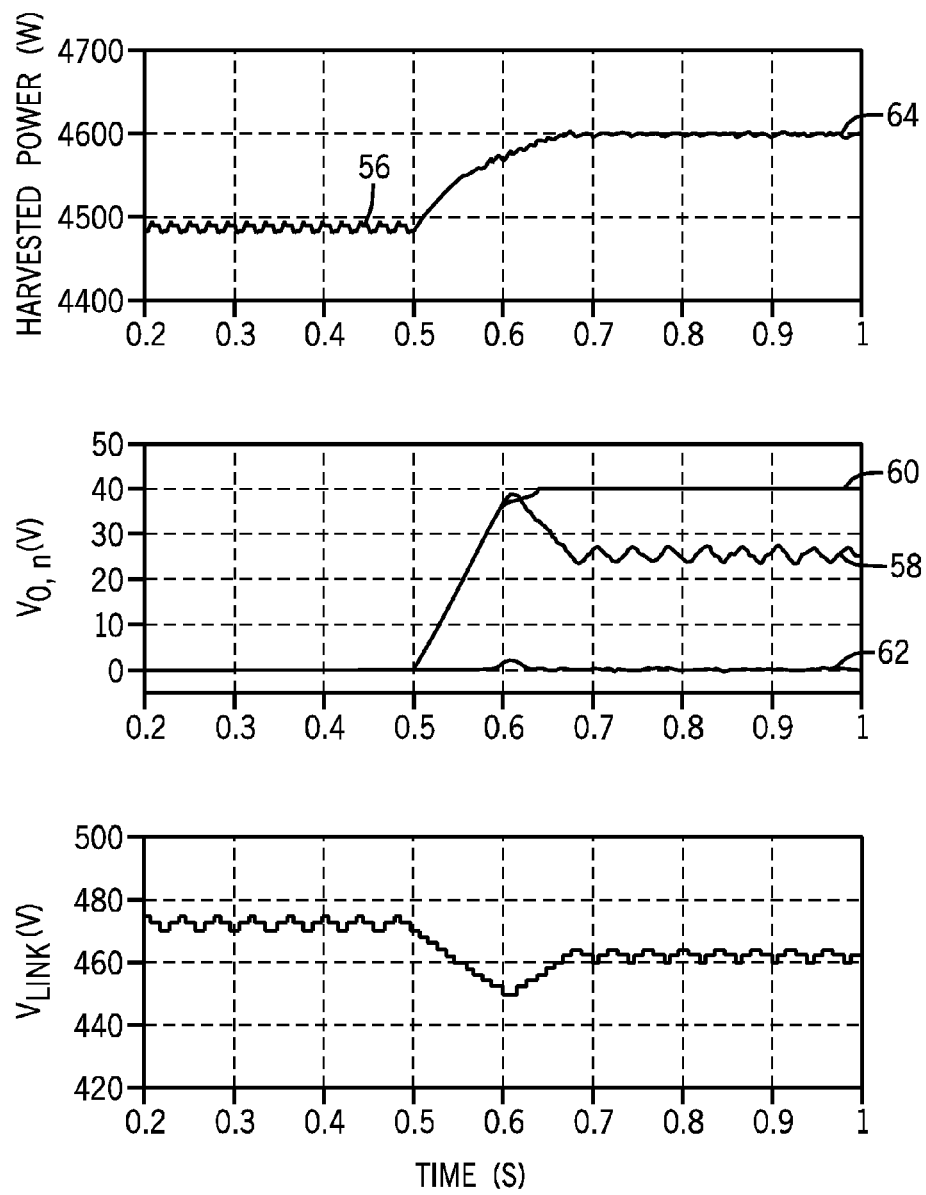
FIG. 5 is a series of graphs illustrating examples of PV system output power, DC/DC converter output voltage, and DC link voltage, achievable with the PV system of FIG. 3 and the technique of FIG. 4.

The range of the output/tuning voltage of delta DC/DC converters 24 is from 0V to 40V. Before 0.5 seconds, the delta DC/DC converters 24 stop working and output voltages of these converters are zero, as shown in simulation results in FIG. 5. The total power harvested from the PV system 10 is 4480 W, indicated by reference numeral 56. After 0.5 seconds, the delta DC/DC converters 24 start working and the power maximizing algorithm is executed by controller 34. After a 0.2 second transition time, tuning voltages of 25V, 40V, and 0V are output by the delta DC/DC converters 24, as illustrated in FIG. 5 by reference numerals 58, 60, and 62, respectively, to bring each PV string up to its optimal operating voltage, so as to maximize power output of each PV string. Upon execution of the power maximizing algorithm, the total power harvested form PV system 10 is 4600 W, indicated by reference numeral 64. Thus, as illustrated in FIG. 5, an additional 120 W is harvested from the PV system 10 by operating each of the PV strings at its optimal operating voltage, which is accomplished by the inclusion of DC/DC converters 24 and associated controllers 34 in PV system 10 and by the implementing of technique 40.

Figure 6:
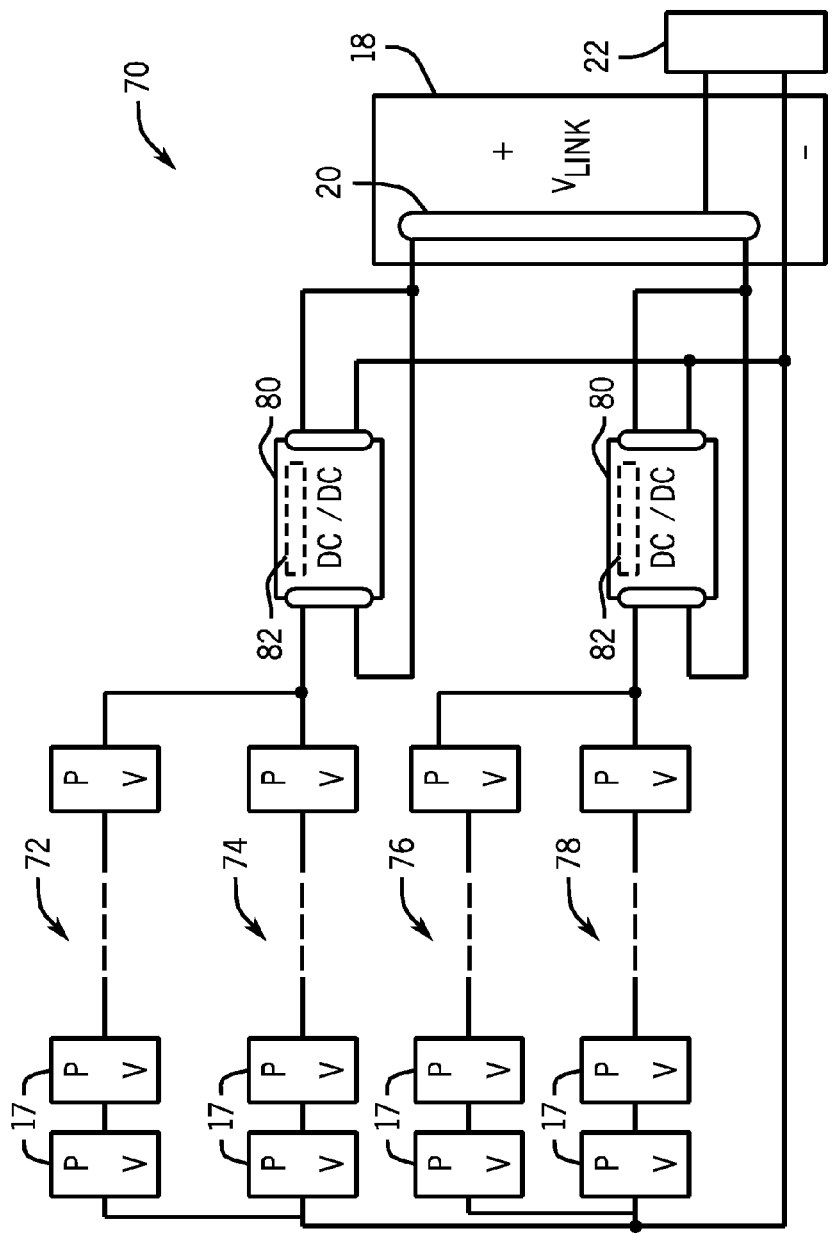
FIG. 6 is a schematic diagram of a PV system according to another embodiment of the invention.

Referring now to FIG. 6, a PV system 70 is illustrated according to another embodiment of the invention. The PV system 70 operates similarly to the PV system 10 shown in FIG. 3; however, the topology of PV system 70 differs slightly from that of PV system 10. Specifically, PV system 70 is configured such that a plurality of PV strings 72, 74, 76, 78 are provided that are arranged in parallel, with a pair of PV strings being connected to each DC/DC converter 80 included in the PV system. While four PV strings 72, 74, 76, 78 are shown in FIG. 6, it is recognized that a greater number of PV strings could be included in PV system 70, with a DC/DC converter 80 being provided for each respective pair of PV strings. Each DC/DC converter 80 is configured to accommodate up to two PV strings and operates similar to the DC/DC converters 24 shown and described in FIG. 3. That is, DC/DC converters 80 each include a controller 82 that control functioning of the DC/DC converters 80, so as to selectively vary a voltage output, $V_o$, of the DC/DC converter 80 that provides "tuning" of its respective PV string voltages. The controller 82 of each DC/DC converter 80 includes a "localized" power maximizing algorithm programmed thereon to iteratively adjust and control generation of the output or tuning voltage, $V_o$, from its respective DC/DC converter 80, that is supplied to the pair of PV strings attached thereto.

Beneficially, embodiments of the inventions thus a system and method for maximizing production of each of a plurality of parallel PV strings by operating each PV string at its optimal operation voltage so as to achieve maximum power extraction. A two-layer power tracking and maximizing algorithm is implemented on a "global" and "local" level of the PV system. The global power tracking and maximizing algorithm, i.e., the global MPPT, is performed for the array of PV strings by the PV inverter, which variably controls a DC link or bus voltage that is provided to each DC/DC converter in the PV system. The localized power tracking and maximizing algorithm is performed by the controller of each DC/DC converter, to control a tuning output voltage of each DC/DC converter that is applied to respective PV strings. Use of the localized power maximizing algorithm allows for the use of small, low cost DC/DC converters connected to each PV string, with the DC/DC converters outputting a small tuning voltage of typically 40V or less to allow operation of each PV string at its optimal operation voltage. By operating each PV string at its optimal voltage to maximize power extraction therefrom, PV system production or harvest can be increased up to 15%. That is, the maximum power extraction can be increased by up to 15%. Thus, substantial gains in production can be realized with a minimal hardware investment (i.e., the adding of small DC/DC converters).

A technical contribution for the disclosed method and apparatus is that it provides for power regulation of photovoltaic (PV) arrays that provides for increased power output for such PV arrays. The production of each of a plurality of parallel PV strings is maximized by operating each PV string at its optimal operation voltage so as to achieve maximum power extraction. The operation of each PV string at its optimal operation voltage is enabled by the controlled operation of DC/DC converters connected to each PV string, with the DC/DC converters being controlled to output a tuning voltage to provide for operation of each PV string at its optimal operation voltage.

Therefore, according to one embodiment of the present invention, a photovoltaic (PV) system includes a plurality of PV strings configured to generate a string output power responsive to received solar irradiation, with each of the plurality of PV strings having an optimal string voltage at which a string output power is maximized. The plurality of PV strings is connected to a DC link in a parallel arrangement such that each of the plurality of PV strings operates at a variable DC link voltage. The PV system also includes a PV inverter electrically connected to the DC link to receive a DC output therefrom, the PV inverter configured to control the DC link voltage and a delta DC/DC converter electrically connected to at least one of the plurality of PV strings. Each DC/DC converter receives the DC link voltage from the DC link and is configured to provide a tuning voltage to the DC link voltage at which its respective PV string operates in order to bring the string voltage for that PV string to its optimal string voltage, with the tuning voltage of each delta DC/DC converter being a difference between the DC link voltage and a respective optimal string voltage.

According to another embodiment of present invention, a method for maximizing power output of a photovoltaic (PV) system including a plurality of PV strings in a parallel arrangement is provided. The method includes the step of operating each of the plurality of PV strings at a DC bus voltage, with the DC bus voltage being determined by a PV inverter that is coupled to the plurality of PV strings by way of a DC bus. The method also includes the steps of providing the DC bus voltage to a delta DC/DC converter electrically connected to each PV string and determining an optimal string voltage for each PV string at which a string output power is maximized, with the optimal string voltage for each PV string being determined from a respective string current and string voltage. The method further includes the steps of comparing, for each PV string, the DC bus voltage to the optimal string voltage of each respective PV string, selectively controlling each delta DC/DC converter based on the comparison of the DC bus voltage and the optimal string voltage of its respective PV string, and operating each PV string at its respective optimal string voltage based on the selective controlling of each DC/DC converter.

According to yet another embodiment of the present invention, a photovoltaic (PV) system includes a PV inverter and a DC link electrically coupled to the PV inverter and operating at a DC link voltage, wherein the DC link voltage is a variable voltage that is determined by the PV inverter according to a global maximum power point tracking (MPPT) algorithm. The PV system also includes a plurality of PV strings connected to the DC link in a parallel arrangement and being configured to generate a string output power responsive to received solar irradiation, wherein each of the plurality of PV strings has an optimal string voltage at which the string output power is maximized. The PV system further includes a plurality of delta DC/DC converters connected to the plurality of PV strings, with each delta DC/DC converter being connected to at least one PV string and to the DC link to receive the DC link voltage therefrom. Each delta DC/DC converter includes a controller programmed to determine the optimal string voltage for its respective PV string at which the string output power is maximized based on a string current and string voltage of its respective PV string compare the DC link voltage to the optimal string voltage of its respective PV string, determine an output voltage needed to bring the string voltage for its respective PV string to its optimal string voltage, and cause the delta DC/DC converter to generate the output voltage, with the output voltage being applied to the respective PV string to generate a string voltage equal to the optimal string voltage. The output voltage is a difference between the DC link voltage and the respective optimal string voltage.

The present invention has been described in terms of the preferred embodiment, and it is recognized that equivalents, alternatives, and modifications, aside from those expressly stated, are possible and within the scope of the appending claims.

What is claimed is:
1. A photovoltaic (PV) system comprising:
   a plurality of PV strings configured to generate a string output power responsive to received solar irradiation, each of the plurality of PV strings having an optimal string voltage at which a string output power is maximized;
a DC link connected to the plurality of PV strings, wherein the plurality of PV strings are connected to the DC link in a parallel arrangement such that each of the plurality of PV strings operates at a variable DC link voltage;
a PV inverter electrically connected to the DC link to receive a DC output therefrom, the PV inverter configured to control the DC link voltage; and
a plurality of delta DC/DC converters electrically connected to the plurality of PV strings such that each of the plurality of delta DC/DC converter is connected to at least one PV string, wherein each DC/DC converter receives the DC link voltage from the DC link and is configured to provide a tuning voltage to the DC link voltage at which its respective PV string operates in order to bring the string voltage for that PV string to its optimal string voltage, the tuning voltage of each delta DC/DC converter being a difference between the DC link voltage and a respective optimal string voltage.

2. The PV system of claim 1 wherein each delta DC/DC converter is connected to one or more PV strings or a pair of PV strings.

3. The PV system of claim 1 wherein each delta DC/DC converter further comprises a controller to control the tuning voltage output by the delta DC/DC converter, the controller being programmed to:
identify a value of the string output power of its respective PV string, the string output power comprising a string voltage and string current;
determine the optimal string voltage for the respective PV string at which the string output power is maximized based on the string output power;
determine a value of the tuning voltage to apply to the respective PV string based on a comparison of the DC link voltage and the optimal string voltage; and
applying a tuning voltage having the determined value to the respective PV string such that the PV string operates at its optimal string voltage.

4. The PV system of claim 3 wherein the controller is further programmed to generate and analyze a tuning voltage reference of the delta DC/DC converter for purposes of updating the tuning voltage, the tuning voltage reference being generated at a first frequency.

5. The PV system of claim 4 wherein the PV inverter is configured to generate and analyze a DC link reference for purposes of tracking a maximum power of the PV system, the DC link reference being generated at a second frequency that is lower than the first frequency.

6. The PV system of claim 1 wherein each delta DC/DC converter comprises an input and an output, wherein the input is connected to the DC link, and wherein the output comprises a pair of output terminals connected to a respective PV string in series.

7. The PV system of claim 1 wherein the tuning voltage has a positive, negative, or zero value.

8. The PV system of claim 1 wherein the delta DC/DC converter comprises a galvanically isolated delta DC/DC converter.

9. The PV system of claim 1 wherein the delta DC/DC converter comprises a galvanically non-isolated delta DC/DC converter.

10. The PV system of claim 1 wherein each of the plurality of PV strings comprises a plurality of PV modules connected in series.

11. The PV system of claim 1 wherein the delta DC/DC converter is configured to generate a tuning voltage of up to 40 V.

12. A method for maximizing power output of a photovoltaic (PV) system including a plurality of PV strings in a parallel arrangement, the method comprising:
operating each of the plurality of PV strings at a DC bus voltage, with the DC bus voltage being determined by a PV inverter that is coupled to the plurality of PV strings by way of a DC bus;
providing the DC bus voltage to a delta DC/DC converter electrically connected to each PV string;
determining an optimal string voltage for each PV string at which a string output power is maximized, the optimal string voltage for each PV string being determined from a respective string current and string voltage;
comparing, for each PV string, the DC bus voltage to the optimal string voltage of each respective PV string;
selectively controlling each delta DC/DC converter based on the comparison of the DC bus voltage and the optimal string voltage of its respective PV string; and
operating each PV string at its respective optimal string voltage based on the selective controlling of each DC/DC converter.

13. The method of claim 12 wherein selectively controlling each delta DC/DC converter comprises causing the delta DC/DC converter to apply a tuning voltage to its respective PV string to adjust the string voltage for that PV string to its optimal string voltage, the tuning voltage of each delta DC/DC converter being a difference between the DC bus voltage and a respective optimal string voltage.

14. The method of claim 13 wherein causing the delta DC/DC converter to apply a tuning voltage comprises
applying an initial tuning voltage, the initial tuning voltage being a zero voltage;
setting a voltage increase flag for controlling adjustment of the tuning voltage, the voltage increase flag having a true setting and a false setting;
applying a voltage increase to the initial tuning voltage to adjust the value thereof in a positive direction if the voltage increase flag is at the true setting; and
applying a voltage decrease to the initial tuning voltage to adjust the value thereof in a negative direction if the voltage increase flag is at the false setting.

15. The method of claim 14 further comprising:
identifying a string power for each of the PV strings upon applying of the tuning voltages thereto;
determining whether the string power for each of the PV strings has increased or decreased based on the tuning voltages applied thereto;
applying, to a PV string, an additional voltage with the same direction or polarity as the previously applied tuning voltage if the string power of that respective PV string has increased as compared to a previous string power; and
applying, to a PV string, an additional voltage with an opposite direction or polarity from the previously applied tuning voltage if the string power of that respective PV string has decreased as compared to the previous string power.

16. The method of claim 12 further comprising iteratively generating, for each delta DC/DC converter, a reference of tuning voltage based on the comparison of the DC bus voltage and the optimal string voltage of its respective PV string.

17. The method of claim 16 further comprising iteratively determining a DC bus voltage at which to operate the plurality of PV strings based on a maximum power output of the PV system;

wherein the iterative generating of a reference of tuning voltage for each delta DC/DC converter occurs at a higher frequency than the iterative determining of a DC bus voltage at which to operate the plurality of PV strings.

18. The method of claim 12 wherein each delta DC/DC converter comprises an output connected to its respective PV string in series.

19. A photovoltaic (PV) system comprising:
a PV inverter;
a DC link electrically coupled to the PV inverter and operating at a DC link voltage, wherein the DC link voltage is a variable voltage that is determined by the PV inverter according to a global maximum power point tracking (MPPT) algorithm;
a plurality of PV strings connected to the DC link in a parallel arrangement and being configured to generate a string output power responsive to received solar irradiation, wherein each of the plurality of PV strings has an optimal string voltage at which the string output power is maximized; and
a plurality of delta DC/DC converters connected to the plurality of PV strings, with each delta DC/DC converter being connected to at least one PV string and to the DC link to receive the DC link voltage therefrom;
wherein each delta DC/DC converter comprises a controller programmed to:
determine the optimal string voltage for its respective PV string at which the string output power is maximized based on a string current and string voltage of its respective PV string;
compare the DC link voltage to the optimal string voltage of its respective PV string;
determine an output voltage needed to bring the string voltage for its respective PV string to its optimal string voltage, with the output voltage being a difference between the DC link voltage and the respective optimal string voltage; and
cause the delta DC/DC converter to generate the output voltage, the output voltage being applied to the respective PV string to generate a string voltage equal to the optimal string voltage.

20. The PV system of claim 19 wherein the output voltage comprises one of a negative voltage, a zero voltage, and a positive voltage.

21. The PV system of claim 19 wherein the controller is programmed to iteratively determine an output voltage needed to bring the string voltage for its respective PV string to its optimal string voltage according to a localized power maximizing algorithm.

22. The PV system of claim 21 wherein the PV inverter implements the global MPPT algorithm at a first frequency and the controllers of the DC/DC converters implement the localized power maximizing algorithm at a second frequency greater than the first frequency.

23. The PV system of claim 21 wherein the global MPPT algorithm and the localized power maximizing algorithm provide two layer tracking and optimization of the power output of the PV system.

* * * * *